United States Patent
Yang

(10) Patent No.: US 8,213,905 B2
(45) Date of Patent: Jul. 3, 2012

(54) METHOD AND DEVICE FOR REALIZING PUSH SERVICE OF GAA

(75) Inventor: Yanmei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 662 days.

(21) Appl. No.: 12/347,766

(22) Filed: Dec. 31, 2008

(65) Prior Publication Data

US 2009/0117877 A1    May 7, 2009

Related U.S. Application Data

(63) Continuation of application No. PCT/CN2007/070217, filed on Jul. 3, 2007.

(30) Foreign Application Priority Data

Jul. 4, 2006 (CN) .......................... 2006 1 0101212
Nov. 17, 2006 (CN) .......................... 2006 1 0145188

(51) Int. Cl.
     *H04M 1/66* (2006.01)
(52) U.S. Cl. ....................... 455/411; 455/90.2
(58) Field of Classification Search .................. 455/410, 455/411, 90.2; 380/278, 279
     See application file for complete search history.

(56) References Cited

U.S. PATENT DOCUMENTS

| 7,628,322 B2 * | 12/2009 | Holtmanns et al. ........... 235/380 |
| 7,631,346 B2 * | 12/2009 | Hinton et al. ...................... 726/8 |
| 2005/0102501 A1 * | 5/2005 | Haukka et al. ................. 713/155 |
| 2005/0246548 A1 | 11/2005 | Laitinen |
| 2007/0086591 A1 * | 4/2007 | Blom et al. .................... 380/279 |
| 2007/0249342 A1 * | 10/2007 | Huang et al. ................ 455/435.1 |

FOREIGN PATENT DOCUMENTS

| CN | 1610364 A | 4/2005 |
| CN | 1770686 A | 5/2006 |

OTHER PUBLICATIONS

First Office Action in counterpart Chinese Application No. 200610145188.4, mailed Aug. 21, 2009.
Written Opinion in counterpart PCT Application No. PCT/CN2007/070217, mailed Oct. 11, 2007.
Extended European Search Report in corresponding European Application No. 07764146.2 (Nov. 29, 2010).

(Continued)

*Primary Examiner* — Cong Tran

(74) *Attorney, Agent, or Firm* — Leydig, Voit & Mayer, Ltd.

(57) ABSTRACT

The present invention discloses a method and a device for realizing PUSH service of GAA. The method includes the steps: the network side determines a PUSH service cryptographic key; the subscriber side communicates with the network side, and determines the PUSH service cryptographic key in accordance with the network side, and communicates with the network side using the PUSH service cryptographic key. By means of the method, the cryptographic key type of the PUSH service can be selected conveniently and agilely according to the actual application situation, and the network side and the subscriber side can select the derivation cryptographic key of the cryptographic key type meeting the requirement to communicate with each other.

16 Claims, 8 Drawing Sheets

OTHER PUBLICATIONS

"ETSI TS 133 220—Universal Mobile Telecommunications System (UMTS); Generic Authentication Architecture (GAA); Generic bootstrapping architecture," Jun. 2006, Version 7.4.0, 3$^{rd}$ Generation Partnership Project, France.

"3GPP TS 33.110—Technical Specification Group Services and System Aspects, Key establishment between a UICC and a terminal," Jun. 2006, Version 1.0.0, 3$^{rd}$ Generation Partnership Project, Valbonne, France.

"3GPP TS 33.xxx—Technical Specification Group Services and System Aspects; Generic Authentication Architecture (GAA); Generic Bootstrapping Architecture (GBA) Push Function (Release 7)," May 2006, Version 0.0.1, 3$^{rd}$ Generation Partnership Project, Valbonne, France.

2$^{nd}$ Office Action in corresponding Chinese Application No. 200610145188.4 (Jun. 9, 2011).

\* cited by examiner

METHOD AND DEVICE FOR REALIZING PUSH SERVICE OF GAA

This application is a continuation of International Patent Application No. PCT/CN2007/070217, filed on Jul. 3, 2007, which claims priority to Chinese Patent Application No. 200610101212.4, filed Jul. 4, 2006 and Chinese Patent Application No. 200610145188.4, filed Nov. 17, 2006 all of which are hereby incorporated by reference in their entireties.

FIELD OF THE INVENTION

The present invention relates to the field of network communication technologies, and in particular to a method and device for implementing a push service of the generic authentication architecture.

BACKGROUND OF THE INVENTION

In the third generation wireless communication standards, various application service entities use a generic framework for accomplishing user identity authentication, which is referred to as the Generic Authentication Architecture (GAA). An application of the generic authentication architecture can check and authenticate the identity of a user of an application service and provide the user accessing the application service with a key for secured communication. The various application service can include a multicast or broadcast service, a user certificate service, an instant messaging service, etc., or a proxy service.

FIG. 1 illustrates a schematic diagram of a framework of the GAA.

The generic authentication architecture is typically consisted of a User Equipment (UE), an entity of Bootstrapping Server Function (BSF) which initially checks and authenticates the identity of a user, a Home Subscriber Server (HSS), an entity of Subscriber Locator Function (SLF) which locates the HSS, and an entity of Network Application Function (NAF). The BSF is used for mutual identity authentication with the UE and also for generation of a shared key, Ks, which the BSF shares with the user, and the HSS stores therein a description file which describes user information and also functions to generate authentication information. Dz, Zh, Zn, Ub and Ua each denote an interface between the respective entities.

Usually, the UE intending to access a service is required to contact the NAF corresponding to the service, that is, the UE is required to initiate actively a connection request to the NAF. If the NAF uses the Generic Authentication Architecture GAA, then the UE is firstly required to perform mutual authentication with the BSF for identity authentication. Upon successful authentication, the UE calculates a derived key Ks_NAF for encrypted communication with the NAF from the key Ks shared with the BSF and transmits a Bootstrapping Session Transaction Identifier (B-TID) to the NAF, and the NAF obtains from BSF the derived key Ks_NAF of the shared key Ks according to the received B-TID. Thus, the UE and the NAF can make use of the derived key Ks_NAF for secured communication via the interface Ua.

The network side is required in some application scenarios to initiate actively a communication request to the UE, which is referred to as a push service. An existing GAA push flow is as follows.

The NAF is firstly required to request the BSF for the derived key Ks_NAF of Ks for communication via the interface Ua prior to transmission of a push message to the user by using the GAA technology.

If the BSF has not negotiated with the UE about any available shared key Ks upon reception of the key request of the NAF, then the BSF acquires a set of authentication vectors from the HSS and calculates Ks and Ks_NAF and transmits to the NAF an authentication token (AUTN) in the set of authentication vectors and the derived key Ks_NAF and also possibly a random number (RAND), a Bootstrapping Session Transaction Identifier (B-TID), a lifetime of the derived key Ks_NAF in the authentication vectors, etc. Then, the NAF transmits, in a push message transmitted to the UE, the information of AUTN, RAND, B-TID, NAF Identifier (NAF_ID), etc., and also possibly encrypted data. The UE authenticates the network and calculates the shared key Ks and the derived key Ks_NAF in accordance with the values of AUTN and RAND.

If the BSF has negotiated with the UE about the available shared key Ks upon reception of the key request of the NAF, then the BSF calculates the derived key Ks_NAF from the shared key Ks and transmits the corresponding B-TID and lifetime of Ks_NAF to the NAF. The NAF carries the B-TID and NAF-ID and also possibly encrypted data in a push message transmitted to the UE. The UE calculates the derived key Ks_NAF from the shared key Ks in the B-TID or searches locally for a Ks_NAF corresponding to the B-TID and uses the key to decrypt the carried encrypted data.

In the case of the UICC based Generic Bootstrapping Authentication architecture (GBA_U), the BSF and the UE may derive two keys from the shared key Ks, i.e., the derived key Ks_int_NAF put on a Universal Integrated Circuit Card (UICC) and the derived key Ks_ext_NAF put on a Mobile Equipment (ME). In this case, the NAF is required to negotiate with the UE about a key to be used for secured communication.

In a UE initiated service, the UE side decides the derived key for use in accordance with the location of an application: if it is a UICC based application, then the derived key Ks_int_NAF put on the UICC is used; and if it is an ME based application, then the derived key Ks_ext_NAF put on the ME is used. Then, the UE notifies the NAF about the selected type of key by indicating to the NAF the location where the application resides. The NAF then determines whether to allow a type of key selected by the terminal in accordance with a local policy or with a policy of the BSF. If it is allowed, then the key is used for communication; otherwise the request of the UE is rejected.

However in the push service, there is no message transmitted between the NAF and the UE before the NAF transmits the push message to the UE. Even in some cases, the UE may not be provided with a feedback channel for transmission of a message to the network side at all. It is thus impossible for the UE to notify the network side about a type of key as it selects. Consequently, this existing approach cannot be applicable in the GAA push process.

SUMMARY OF THE INVENTION

Embodiments of the invention provide a method and device for implementing a push service of the generic authentication architecture so as to overcome unavailability of a GAA push service application in the case of GBA_U in the prior art to thereby ensure service security.

According to an embodiment of the present invention, a method for implementing a push service of the generic authentication architecture is provided. The method includes the following: determining, at a network side, a push service key; using the push service key to protect push service; and notifying, by the network side, a user side the push service key type so that the user side obtains the push service by using a qualified push service key associated with the push service key type.

According to another embodiment of the present invention, a method for implementing a push service of the generic authentication architecture according to the invention is provided, which includes the following.

A method for implementing a push service of the generic authentication architecture that includes (1) determining, at the network side, a push service key, and using the push service key for communication with the user side; and (2) determining, at the user side in communication with the network side, a push service key consistent with the network side, and using the push service key to obtain push service.

According to another embodiment of the present invention, a network application function entity NAF is provided, which includes the following: a push service key determination unit, adapted to determine a push service key as required for use; and an interaction unit, adapted to notify the user side about the push service key determined at the network side and to push service security-protected with the push service key to the user side.

According to a yet another embodiment of the present invention, a bootstrapping authentication protocol server function entity BSF is provided, which includes the following a push service key determination unit, adapted to determine a push service key as required for use; and an interaction unit, adapted to notify the user side and/or a network application function entity NAF about the determined push service key as required for use.

As can be seen from the technical solutions according to the embodiments of the invention that, in a push service according to the embodiments of the invention, the network side determines a qualified push service key or both the push service key and a type of key and uses the key to encrypt push service for transmission to the user side; and the user side selects a push service key with which the push service encrypted at the network side can be recognized and uses the key for communication with the network side. In a practical implementation, a key selection rule for use in the push service can be determined in an application specification, by the BSF operator or the NAF operator, or jointly by the user, the BSF operator and the NAF operator, thereby adapting conveniently and flexibly to demands in different application scenarios. A corresponding derived key is selected by the determined type of key as a push service key to ensure effectively security of the push service.

DETAILED DESCRIPTION OF THE EMBODIMENTS

Figure 1:
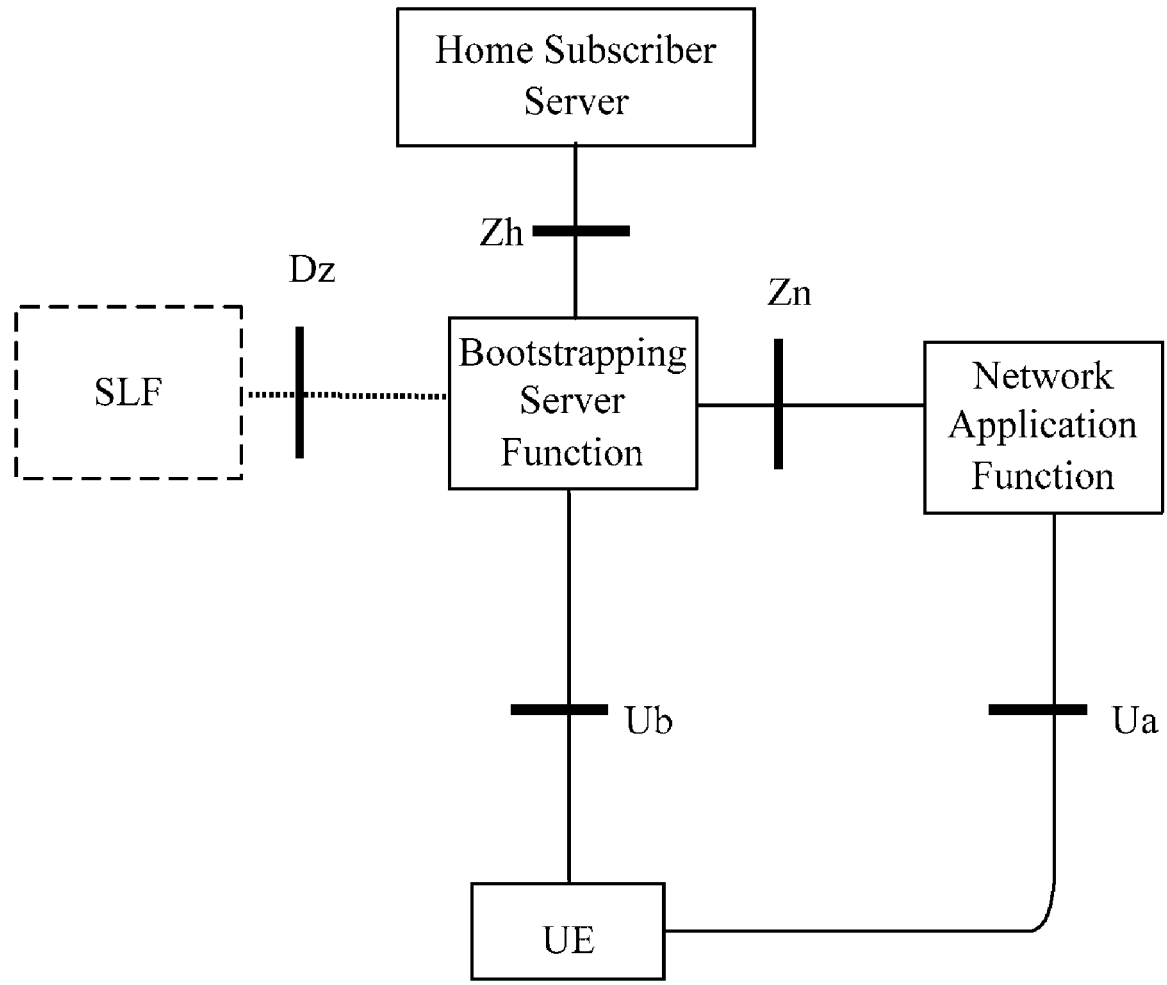
FIG. 1 illustrates a schematic diagram of a framework of a generic authentication architecture.

In a push service according to the embodiments of the invention, the network side selects a qualified push service key or both the push service key and a type of key and uses the key to encrypt push service for transmission to the user side; and the user side selects a push service key with which the push service encrypted at the network side can be recognized and uses the key for communication with the network side. The push service key is the derived key of a key Ks shared by the BSF and the UE (Ks_int_NAF or Ks_(ext)_NAF). Since in the case of GBA_U, the BSF and the UE may derive two keys from the shared key Ks, i.e., the derived key Ks_int_NAF put on the UICC and the derived key Ks_ext_NAF put on the ME. Therefore in view of this case, a rule of selecting a type of key for use in the push service can be determined in an application specification, by a BSF operator or an NAF operator, or jointly by the user, the BSF operator and the NAF operator in the embodiments of the invention.

If the key selection rule is determined jointly by the user, the BSF operator and the NAF operator, then the user who subscribes for a service can negotiate with the network about a type of key, and a negotiation result can be put in a user subscription file. Alternatively, the mobile equipment at the user side can store this selection result.

If the user and the BSF operator negotiate, then key selection policy information at the network side can be put in a user subscription file of the HSS, for example, in User Security Settings (USS) of Generic bootstrapping authentication architecture User Security Settings (GUSS). The BSF can decide the type of key to be used for the push service and then transmit an available key (Ks_int_NAF or Ks_(ext)_NAF) to the NAF. Alternatively, the BSF can determine the type of the GBA in accordance with a UICC attribute, calculate derived keys of Ks and transmit all the resulting derived keys (two derived keys of Ks_int_NAF Ks_ext_NAF) together with the key selection policy in the user subscription file to the NAF, and the NAF can decide to select a type of key to be used for the push service.

In this case, the user side is just required to select a type of key to decrypt a push message in accordance with a locally stored key selection type.

If the user and the NAF operator negotiate, then the NAF is required to store key selection type information corresponding to the user and uses directly a selected key upon pushing the service to the user, and also the user side is just required to select a type of key to decrypt a push service message in accordance with a locally stored key selection type.

If the key selection rule is prescribed by the application specification, then it can be prescribed that: if the UICC is GBA enabled, then the key stored on the UICC shall be selected; if the UICC is not GBA enabled, then the key stored on the ME shall be selected. The BSF determines a type of key for use via the interface Ua and selects a key (on the ME or the UICC) upon reception of a push service key request of the NAF or in accordance with the UICC attribute and the prescription of the application specification and then transmits the selected key to the NAF, or transmits the UICC attribute together with the two keys to the NAF, and the NAF makes selection in accordance with the application specification.

In this case, the user side of course can select a key to be used for decryption of a push message in accordance with its own UICC attribute and the prescription of the application specification.

If no key selection policy is prescribed in the application specification and instead it is prescribed only by the BSF operator or NAF operator at the network side, then selection can be made in the following ways.

1. The network side selects and uses a key in accordance with one or more information among the UICC attribute of the user, the policy of the network operator and the policy of the NAF operator, and then transmits in a push message an indication of a type of key in use. The user side selects a key for decrypting in accordance with the indication upon reception of the push message.

2. The network side selects and uses a key in accordance with the UICC attribute of the user, the policy of the BSF operator or the NAF operator at the network side but does not transmit any key type indication to the user, and instead the user himself makes an attempt. In the case of GBA_U, the user equipment may calculate two keys, and firstly use one of the keys for decrypting and then use the other key upon failure.

3. The NAF itself determines which part of UE (ME or UICC) decrypt the received data. If it is UICC part, then the derived key of Ks stored on the UICC is used for encryption, otherwise the derived key of Ks stored on the ME is used. The user equipment itself also can determine whether a push message shall be processed by the ME or the UICC. If the message is processed by the ME, then the ME uses the derived key on the ME; if the message is processed by the UICC, then the UICC uses the derived key on the UICC.

4. The network side selects a key in accordance with its own policy, uses the key to encrypt push service, and then transmits it to the user side. The user equipment somehow has pre-obtained the key selection policy at the network side, for example, by automatic downloading, from a service announcement at the network side, by local storage of key selection information when the user subscribes with the network, etc. Upon reception of a push message, the user side selects a key for decryption of the push message in accordance with the policy. For example, an application client capable of receiving such a message is placed at a qualified location in a way that the application client is placed on the ME if the derived key on the ME is required for use or placed on the UICC if the derived key on the UICC is required for use. The policy at the network side may vary, and therefore in this case, the user is required to obtain dynamically the latest policy of the network. Upon change in the policy at the network side, the user side can be notified about the policy, a service announcement can be transmitted periodically to the user to notify him about the latest policy at the network side, or the user can download periodically from the network for update.

5. In analogy to active initiation of a service from the user side, an application client is pre-placed at a location as necessary in view of other reasons, and a type of key is decided in accordance with the location where the application client resides in a way that the key on the ME is selected for an ME based application or the key on the UICC is selected for a UICC based application. The NAF at the network side can obtain the location of the application client in the following possible ways to thereby determine an available type of key.

(1) The user notifies the network side upon registering a service for subscription. The subscription information can be stored in the HSS, the BSF or the NAF. No push service will be transmitted to the user if a key selected in accordance with the location of the application client is not qualified as required by the NAF or BSF operator.

(2) The location is known from the application per se. For example, an application can only be implemented on the ME or the UICC. The location information of the application on the equipment at the user side can be stored in the subscription file of the user and obtained by the BSF reading the subscription file of the user upon need of knowing the location information of the application.

(3) The network side carries no data encrypted with a derived key of Ks upon transmission of the first push message, decides a derived key for use in accordance with a response from the user side or information indicative of the location where an application resides upon reception of the response message, and then transmits data encrypted with the corresponding derived key of Ks. Of course, if the type of key indicated from the user side is not qualified as required at the network side, then the NAF will not transmit subsequent data to the user any more.

The invention will be further detailed below with reference to the drawings and the embodiments thereof to make those skilled in the art better understand the solution of the invention.

Figure 2:
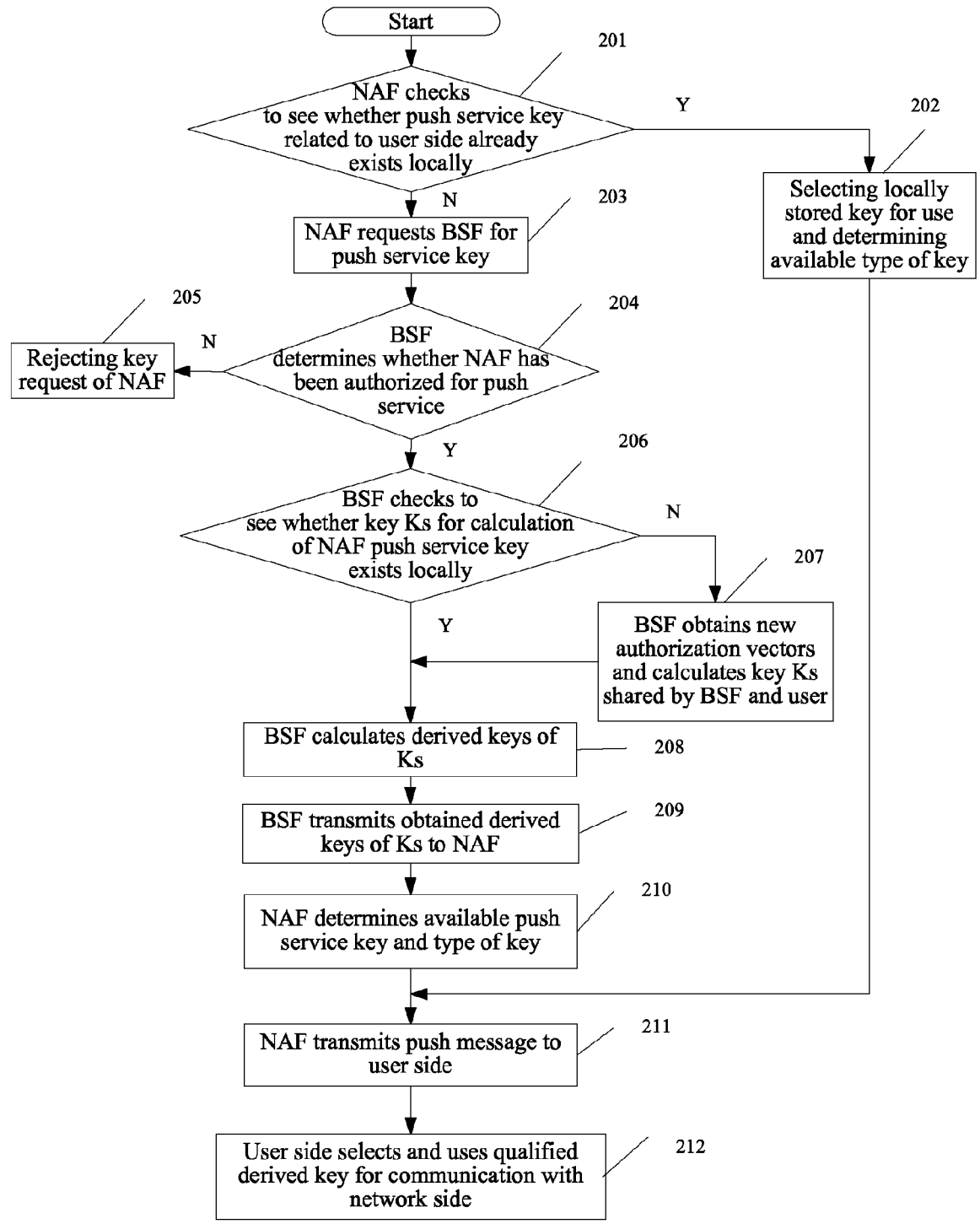
FIG. 2 illustrates an implementation flow chart of a method according to a first embodiment of the present invention.

Reference is made to FIG. 2, which illustrates an implementation flow of a method according to a first embodiment of the invention, and the method includes the following steps.

Step 201: The NAF required to implement a push service checks to see whether a push service key related to the user side already exists locally, and if so, the process proceeds to step 202; otherwise, the process proceeds to step 203.

Step 202: It selects the locally stored key for use and determines an available type of key and thereafter executes step 211.

Step 203: The NAF requests the BSF for a pushing service key.

Identifier information of the user, identifier information of the NAF, etc., can be carried in the request message. Particularly, the user identifier can be a private identifier of IP Multimedia subsystem Private subscriber identity Identifier (IMPI) or a permanent identifier of International Mobile Subscriber Identifier (IMSI) for the user or other identifier information which can uniquely identify the user.

Step 204: The BSF determines whether the NAF has been authorized for the push service, and if not so, then the process proceeds to step 205; otherwise the process proceeds to step 206.

The BSF can determine whether the NAF has been authorized in accordance with subscription information of the user or a subscription relationship of the NAF operator with the BSF operator.

Step 205: The key request of the NAF is rejected and the flow ends.

The above step 204 and step 205 are optional steps. In other words, the BSF may alternatively not determine whether the NAF has been authorized for the push service.

Step 206: The BSF checks to see whether a key Ks for calculation of a push service key of the NAF exists locally, and if not so, then the process proceeds to step 207; otherwise, the process proceeds to step 208.

As mentioned previously, the NAF can include the identifier information of the user and the identifier information of the NAF in transmission of the push service key request message to the BSF, and therefore the BSF can check against the information to see whether there is one among locally stored available keys corresponding to the information, i.e., the available key Ks for calculation of a push service key of the NAF.

This step may be skipped if Ks in the GAA push cannot be reused, and the flow proceeds directly to step 207.

Step 207: The BSF obtains new authentication vectors and calculates the key Ks which it shares with the user.

The subscription information of the user is stored in the HSS, as known to those skilled in the art. Therefore, the BSF can obtain a set of authentication vectors corresponding to the user from the HSS in accordance with the user identifier contained in the received push service key request message, and calculate the shared key Ks and the derived keys Ks_NAF or Ks_(ext/int)_NAF of Ks.

Step 208: The BSF calculates the derived keys Ks_NAF/ Ks_(ext/int)_NAF of Ks.

In the case of the GBA_U, the BSF and the user may derive two keys from Ks, one of which is put on the Universal Integrated Circuit Card (UICC), i.e., Ks_int_NAF, and the other of which is put on the ME, i.e., Ks_ext_NAF. In this case, a type of key available to the NAF shall be determined. In other words, it is determined whether the NAF shall use the derived key stored on the UICC or that on the ME.

If the BSF can calculate both of the derived keys of Ks, then a type of key required for the NAF can be determined by the BSF alone or by the BSF and the NAF jointly.

Step 209: The BSF transmits the obtained derived key(s) of Ks to the NAF.

The BSF can also transmit to the NAF the information of AUTN, B-TID, key lifetime, etc., and also possibly other parameters for calculation of the push service key.

Since the BSF can determine alone a type of key required for the NAF, then the BSF can transmit to the NAF only the selected derived key of Ks and also possibly the type of key corresponding therewith. Alternatively, the BSF can transmit to the NAF both of the obtained derived key of Ks and a key selection policy prescribed by the BSF (e.g., an indication of the type of key allowed for use), so that the NAF can determine the available type of key in accordance with the policy. Of course, it is also possible that only the two obtained derived keys of Ks may be transmitted to the NAF, and the NAF can select a type of key for use in accordance with its own key selection policy or a type of key prescribed in the application specification and also possibly in connection with capability information of the user.

Of course, the BSF itself can firstly select a key for use and then calculate a qualified derived key of Ks.

Selection of one of the approaches for use can be determined in accordance with the system application environment, the terminal subscription information, the terminal capabilities, etc. A specific way for selecting a type of key will be detailed later illustratively.

Step 210: The NAF determines the available push service key and type of key.

Step 211: The NAF transmits a push message to the user side.

The NAF can transmit a key selection policy at the network side (simply an indication of the type of key selected by the NAF) in the message.

It should be noted that application data to be protected with Ks_(ext/int)_NAF (e.g., encryption, integrity-protection, etc.) and the information PUSH_INFO (e.g., AUTN, B-TID) required for calculating Ks_(ext/int)_NAF can be transmitted in the same message or separately. In the case of separate transmission, the key selection policy may be transmitted together with a push message carrying PUSH_INFO or may be put into a push message in which application data is transmitted and be transmitted therewith.

Step 212: The user side selects a qualified derived key, which is a push service key consistent with the network side, and uses the key for communication with the network side.

Upon reception of the push message transmitted from the NAF, the user side determines a type of key to be used prior to use of the derived key of Ks to decrypt the push service. For example, a qualified derived key can be selected for use in the following ways.

(1) If there is a type of key indication, i.e., a key selection policy, in the push message, then a corresponding key may be used to decrypt the push service.

(2) If a preferred key has been prescribed for the application, then selection can be made in a way that firstly a key is selected and then the location of a decryption point is decided. The user equipment may select a qualified derived key in accordance with the prescription of the application specification and the UICC attribute (GBA enabled or not) and use the derived key to decrypt the push service.

(3) It is decided from an attribute of the application per se. For example, if the application can only be implemented on the UICC or the ME, then a qualified derived key can be selected in a principle that a key shall be stored right at the place where the application client is located and then can be used to decrypt the push service.

(4) If the user equipment has preconfigured key selection information corresponding to the application, then selection may be made as configured.

(5) An adaptive way is used, that is, in the case of GBA_U, the user equipment may calculate two keys, and firstly use one of the keys for decrypting and then use the other key for decrypting upon failure.

As mentioned previously, if two derived keys of Ks are present on or calculated by the BSF, then a type of key required for the NAF can be determined by the BSF alone or by the BSF and the NAF jointly.

According to the invention, the BSF can select a type of key available to the NAF in any of the following ways.

(1) The BSF determines a type of key required for the NAF in accordance with a key selection rule determined by the user upon subscription with the network.

(2) The BSF determines a type of key required for the NAF in accordance with an attribute of the application per se. For example, the derived key stored on the universal integrated circuit card UICC may be selected for use if the application is on the UICC, and the derived key stored on the mobile equipment ME may be selected for use if the application on the ME.

(3) The BSF determines a type of key required for the NAF in accordance with a key selection rule prescribed in the application specification and the user attribute. For example, if a preferred type of key is prescribed in the application specification, then the prescribed preferred type of key may be selected preferentially as a type of key required for the NAF; and if no key selection prescription is determined in the application specification, then the BSF can determine a type of key required for the NAF in accordance with an attribute of the application per se.

Alternatively, the BSF and the NAF can determine jointly a push service key or both a push service key and a type of key required for the NAF in numerous ways.

Figure 3:
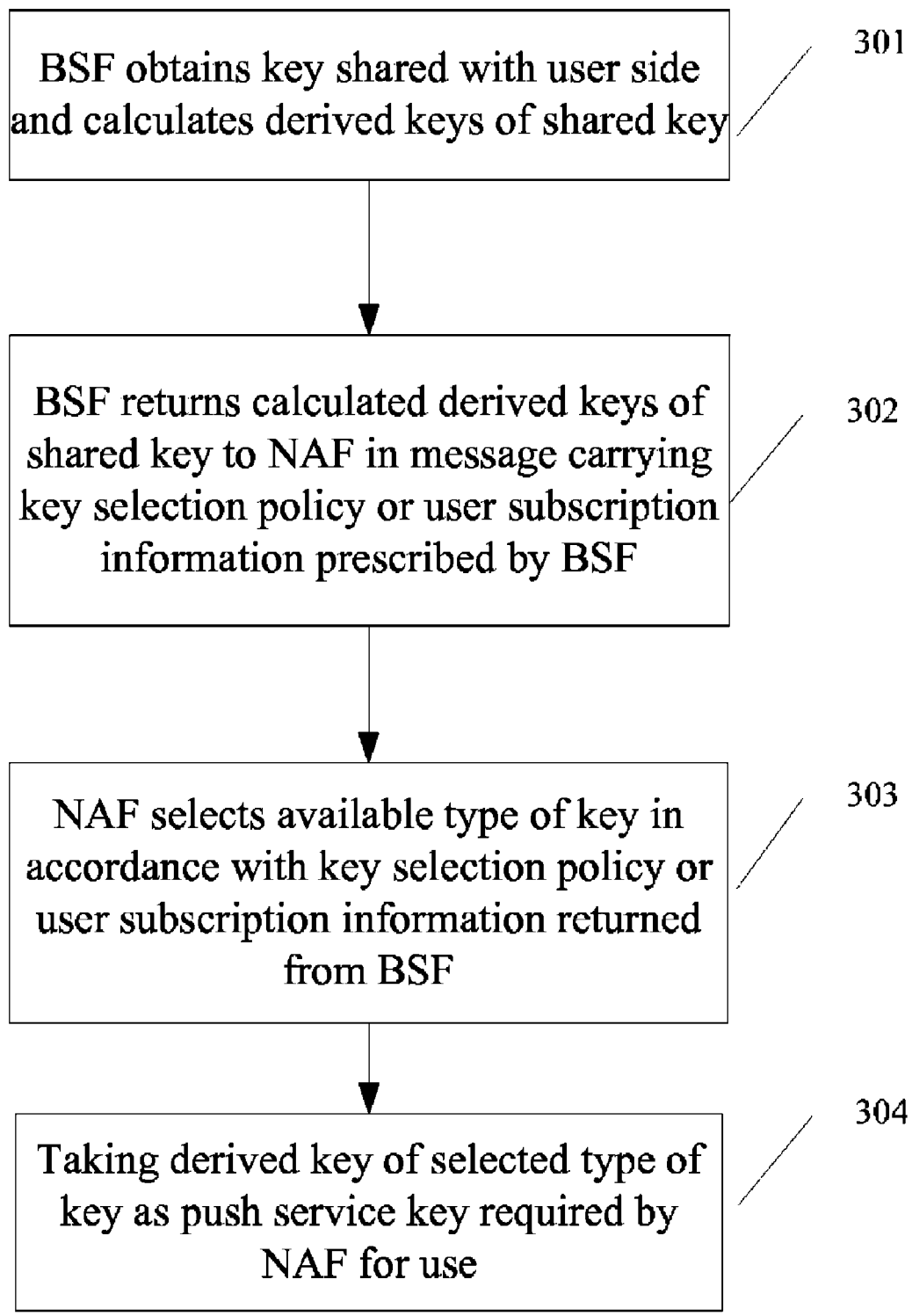
FIG. 3 illustrates a method flow chart of an implementation in which a BSF and an NAF determine jointly a type of key according to an embodiment of the present invention.

Reference is made to FIG. 3 illustrating a BSF and an NAF determine jointly a type of key, and the implementation flow includes the following steps.

Step 301: The BSF obtains a key shared with the user side and calculates derived keys of the shared key.

Step 302: The BSF responses the calculated derived keys of the shared key to the NAF in a message carrying a key selection policy or user subscription information prescribed by the BSF.

The key selection policy prescribed by the BSF may be, for example, that only Ks_int_NAF can be allowed for use or both can be allowed with preference for Ks_int_NAF.

Step 303: The NAF selects an available type of key in accordance with the key selection policy or user subscription information sent from the BSF.

If the BSF sends no key selection policy, then the NAF selects an available type of key in accordance with its own policy.

Step 304: A derived key of the selected type of key is taken as a push service key required by the NAF for use.

In the above step 302, the BSF can alternatively return only the calculated derived keys of the shared key to the NAF, and then the NAF can select an available type of key in accordance with its own key selection policy and also possibly in connection with UICC capability information of the user. The NAF can obtain UICC capabilities of the user upon user subscription or obtain the capability information of the user from the BSF.

The key selection policy of the NAF may be, for example, that only Ks_int_NAF can be allowed for use or both can be allowed with preference for Ks_int_NAF, that is, if the user card is capable of supporting a GBA key derivation function, then Ks_int_NAF can be selected; otherwise Ks_NAF may be selected.

Detailed descriptions will be further given below of a message flow when the network side and the user side interact according to the invention.

Figure 4:
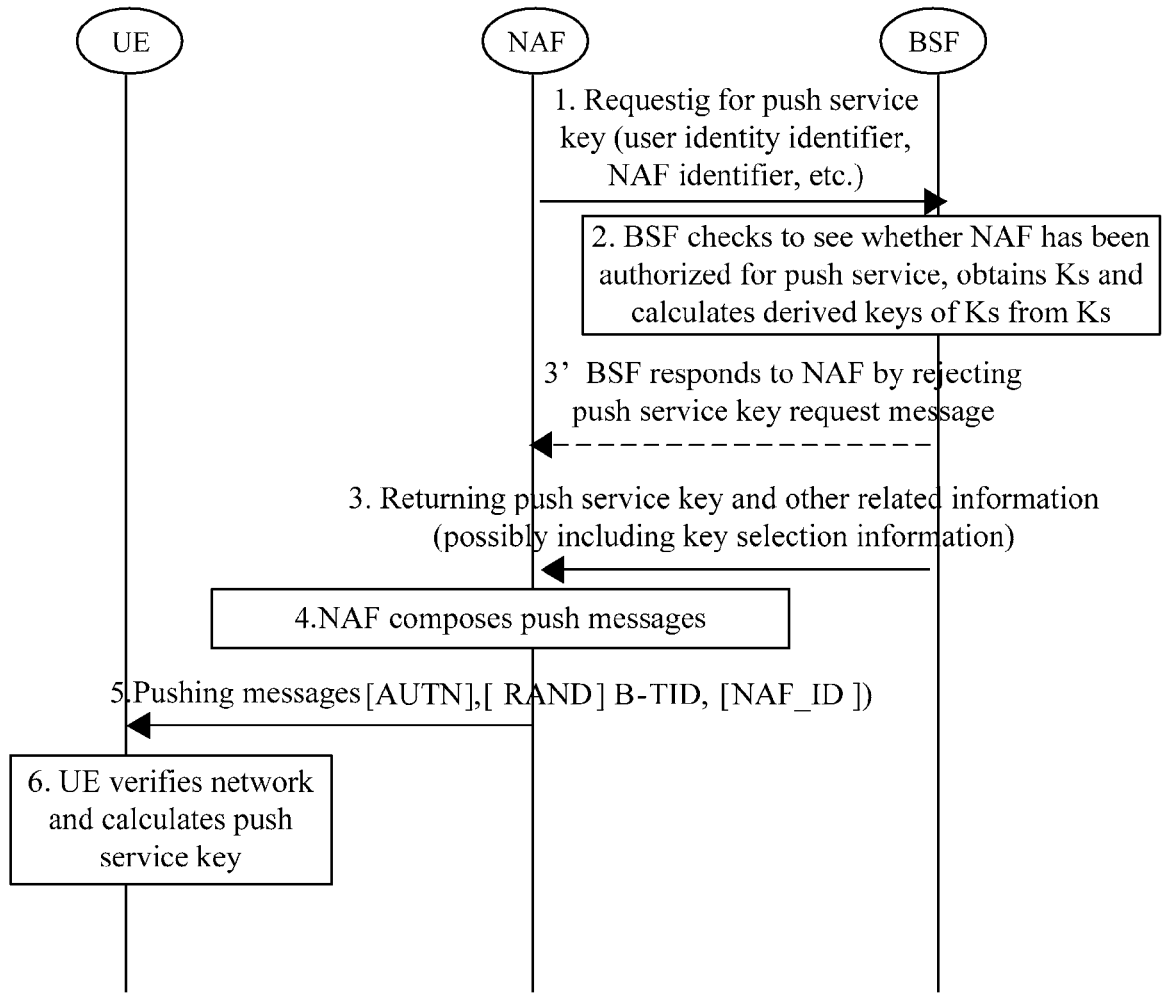
FIG. 4 illustrates a method flow chart of message interaction between the network side and the user side according to an embodiment of the present invention.

Reference is made to FIG. 4, which illustrates a flow of an embodiment in which the network side and the user side interact through messages.

1. The NAF intends to transmit a push message to a user. If there is not yet any push service key locally, then the NAF requests the BSF for a push service key by carrying information of a user identifier, an NAF identifier (NAF_ID), etc., in a request message. Particularly, the user identifier may be a private identifier IMPI or permanent identifier IMSI of the user or another identifier which can uniquely identify the user. If a push service key related to the user already exists at the NAF, then the flow proceeds directly to step 4.

2. The BSF checks to see whether the NAF has been authorized for a push service. If the NAF has not been authorized for the push service, then the BSF proceeds to step 3'; otherwise the BSF obtains Ks and calculates derived keys Ks_(ext/int)_push_NAF of Ks from Ks.

Firstly, the BSF searches for a locally available Ks corresponding to the user. If available Ks already exists, then the BSF calculates derived keys Ks_(ext/int)_push_NAF of Ks from Ks as a push service key of the NAF; otherwise, the BSF firstly obtains a set of new authentication vectors, obtains Ks from existing parameters, calculates derived keys of Ks as a push service key Ks_(ext/int)_push_NAF of the NAF. Then, the BSF proceeds to step 3.

3'. The BSF responds to the NAF by rejecting the push service key request message. This step is optional.

3. The BSF transmits to the NAF the B-TID, key lifetime and calculated push service keys Ks_(ext/int)_push_NAF of the NAF and also possibly AUTN and other parameters for calculation of a push service key.

The BSF can determine a type of derived key of Ks to be used for protection of the push service (especially in the case of GBA_U) and transmit only an available key to the NAF for use. Specifically, it can be determined which type of key the NAF shall use as a key for encryption of push information in the following ways.

(1) Use of which type of key has been negotiated about between the user and the network upon subscription and put in a user subscription file (e.g., in GUSS of the user subscription file in the HSS), and then the BSF can make determination in accordance with subscription information.

(2) The location where the application client is located at the equipment side (ME or UICC) is provided in user subscription information. The BSF can make selection in a principle that a key shall be stored right at the place where the application client is located.

(3) Determination is made in accordance with an attribute of the application per se. For example, if the application can only be implemented on the UICC or the ME, then the BSF can make selection in a principle that a key shall be stored right at the place where the application client is located.

(4) If a preferred key has been prescribed in the application specification, then selection can be made in a way that firstly a key is selected and then the location of a decryption point is decided. The BSF may make selection in accordance with the prescription of the application specification and a UICC attribute (GBA enabled or not).

Alternatively, the BSF may not determine a type of derived key of Ks to be used for protection of the push service but may transmit only user subscription information (e.g., USS) to the NAF.

4. The NAF composes a push message which may be transmitted together with push service encrypted by the derived key of Ks. A type of key for use can be selected in the following ways.

(1) If the BSF responds only one type of key, then the key may be used.

(2) If the BSF responds two types of keys as well as a key selection policy or user subscription information, then the NAF can make selection in accordance with the key selection policy or user subscription information. With respect to the subscription information, the user and the operator may have pre-negotiated about a type of key for use or the location of a decryption point (ME or UICC).

(3) If a preferred key has been prescribed in the application specification, then selection can be made in a way that firstly a key is selected and then the location of a decryption point is decided. The NAF may make selection in accordance with the prescription of the application specification and a UICC attribute (GBA enabled or not).

(4) The NAF may make selection in accordance with its own policy or locally stored user information and also possibly in connection with a UICC attribute, which can be obtained in GUSS returned from the BSF.

(5) Determination is made in accordance with an attribute of the application per se. For example, if the application can only be implemented on the UICC or the ME, then NAF can make selection in a principle that a key shall be stored right at the place where the application client is located.

5. The NAF transmits to the UE a push message, which may includes the information of B-TID, NAF_ID, AUTN, etc., and also possibly a type identifier of the derived key of Ks selected by the NAF and also possibly push service protected with the selected derived key of Ks. In the diagram, "[ ]" in this step denotes an optional parameter and will equally apply below.

It should be noted that the foregoing descriptions are applicable to a case of transmitting application data and information required for calculation of a Ks derived (e.g., AUTN) in the same message. Furthermore as mentioned previously, the application data may be transmitted separately from the information required for a Ks derived. In the case of separate transmission, a type-of-key identifier can be transmitted to the UE in a push message carrying either of them.

6. Upon reception of the push message containing the application data, the UE shall determine a type of derived key of Ks for use prior to use of the derived key to decrypt the push data. A type of key can be determined for use in the following ways.

(1) If a type-of-key indication is provided in the push message, then a corresponding key may be used for decryption.

(2) If a preferred key has been prescribed for the application, then selection can be made in a way that firstly a key is selected and then the location of a decryption point is decided. The UE may make selection in accordance with the prescription of the application specification and a UICC attribute (GBA enabled or not).

(3) Determination is made in accordance with an attribute of the application per se. For example, if the application can only be implemented on the UICC or the ME, then the BSF can make selection in a principle that a key shall be stored right at the place where the application client is located.

(4) If the UE has preconfigured key selection information corresponding to the application, then selection may be made as configured.

(5) An adaptive way is used, that is, in the case of GBA_U, the equipment may calculate two keys, and firstly use one of the keys for decryption and then use the other key for decryption upon failure.

Figure 5:
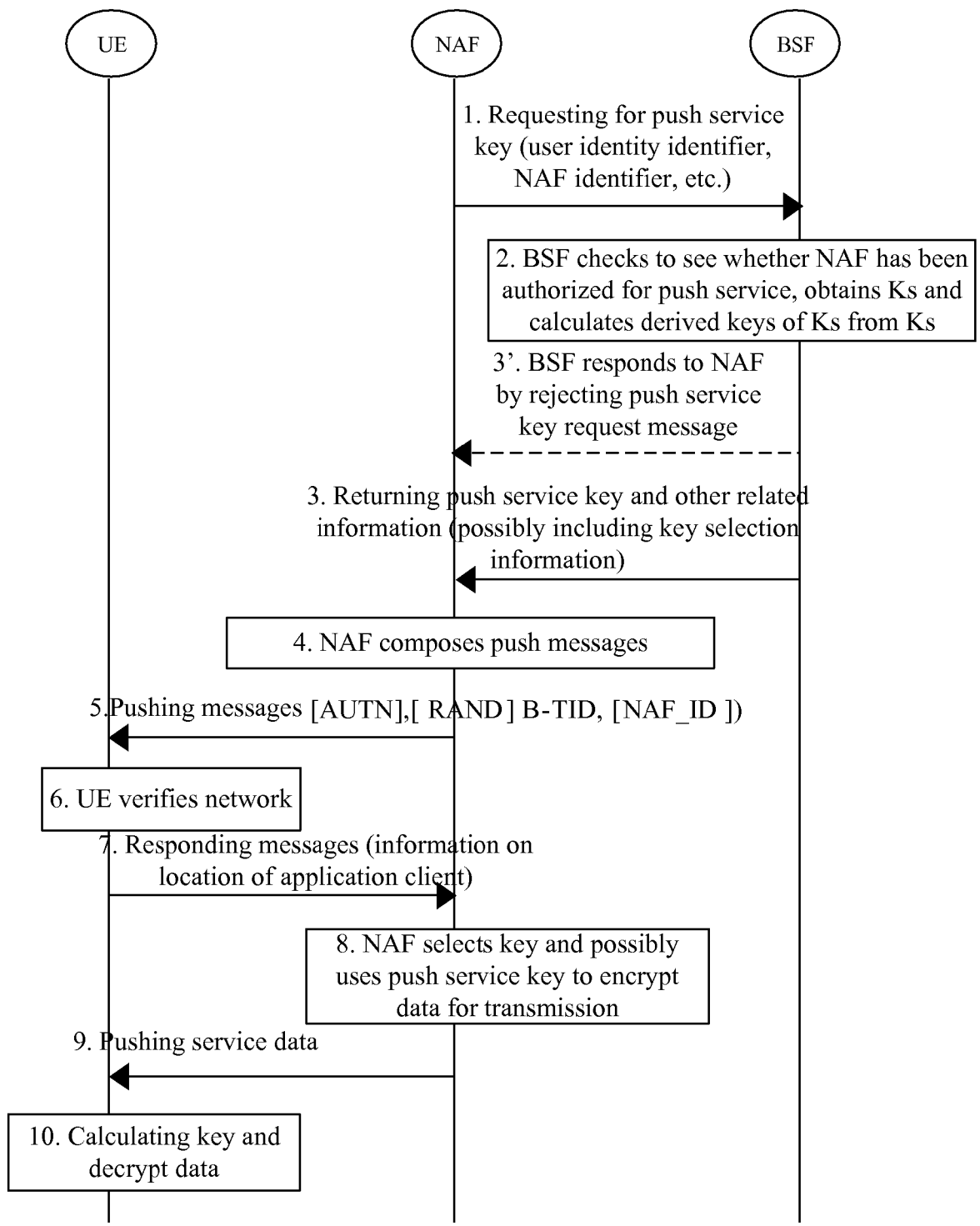
FIG. 5 illustrates a method flow chart of alternative message interaction between the network side and the user side according to an embodiment of the present invention.

Reference is made to FIG. 5 illustrating a flow of another embodiment in which the network side and the user side interact through messages.

1. The NAF intends to transmit a push message to a user. If there is not yet any push service key locally, then the NAF requests the BSF for a push service key by carrying information such as a user identifier, an NAF identifier (NAF_ID), etc., in a request message. Particularly, the user identifier may be a private identifier IMPI or permanent identifier IMSI of the user or another identifier which can uniquely identify the user. If a push service key related to the user already exists at the NAF, then the flow proceeds directly to step 4.

2. The BSF checks to see whether the NAF has been authorized for a push service. If the NAF has not been authorized for the push service, then the BSF proceeds to step 3'; otherwise the BSF obtains Ks and calculates derived keys Ks_(ext/int)_push_NAF of Ks from Ks.

Firstly, the BSF searches for a locally available Ks corresponding to the user. If available Ks already exists, then the BSF calculates derived keys Ks_(ext/int)_push_NAF of Ks from Ks as a push service key of the NAF; otherwise, the BSF firstly obtains a set of new authentication vectors, obtains Ks from existing parameters, calculates derived keys of Ks as a push service key Ks_(ext/int)_push_NAF of the NAF. Then, the BSF proceeds to step 3.

Of course, if no Ks can be reused, then the BSF may not need to determine whether available Ks already exists, and instead may obtain directly new authentication vectors for Ks.

3'. The BSF responds to the NAF by rejecting the push service key request message.

3. The BSF transmits to the NAF the calculated push service keys Ks_(ext/int)_push_NAF of the NAF and also possibly the key lifetime and/or other parameters for calculation of a push service key, e.g., AUTN, B-TID, etc.

The BSF can determine a type of derived key of Ks to be used for protection of the push service (especially in the case of GBA_U) and transmit only an available key to the NAF for use. Specifically, it can be determined which type of key the NAF shall use as a key for encryption of push information in the following ways.

(1) Use of which type of key has been negotiated about between the user and the network upon subscription and put in a user subscription file (e.g., in GUSS of the user subscription file in the HSS), and then the BSF can make determination in accordance with subscription information.

(2) The location where the application client is located at the equipment side (ME or UICC) is provided in user subscription information. The BSF can make selection in a principle that a key shall be stored right at the place where the application client is located.

(3) Determination is made in accordance with an attribute of the application per se. For example, if the application can only be implemented on the UICC or the ME, then the BSF can make selection in a principle that a key shall be stored right at the place where the application client is located.

(4) If a preferred key has been prescribed in the application specification, then selection can be made in a way that firstly a key is selected and then the location of a decryption point is decided. The BSF may make selection in accordance with the prescription of the application specification and a UICC attribute (GBA enabled or not).

Alternatively, the BSF may not determine a type of derived key of Ks to be used for protection of the push service but may transmit only user subscription information (e.g., USS) to the NAF.

4. The NAF composes a push message which contains no data encrypted or integrity-protected with the derived key of Ks.

5. The first push message is transmitted to the UE. At this time, a key selection policy at the network side can be transmitted as well. The policy may be a policy prescribed by the NAF itself or by the BSF and may indicate that only one or both types of key can be used.

6. Upon reception of the push message, the UE verifies legality of the message, and the application client selects a supported type of key.

7. The UE transmits a response message to the network while notifying the NAF about the selected type of key (i.e., the location of the decryption point at the application client).

8. The NAF protects push service with the key selected by the UE or ends the flow if the user side returns an unqualified type.

9. The NAF transmits the encrypted data to the UE.

10. The UE calculates a derived key of Ks and uses the appropriate key for decryption.

Figure 6:
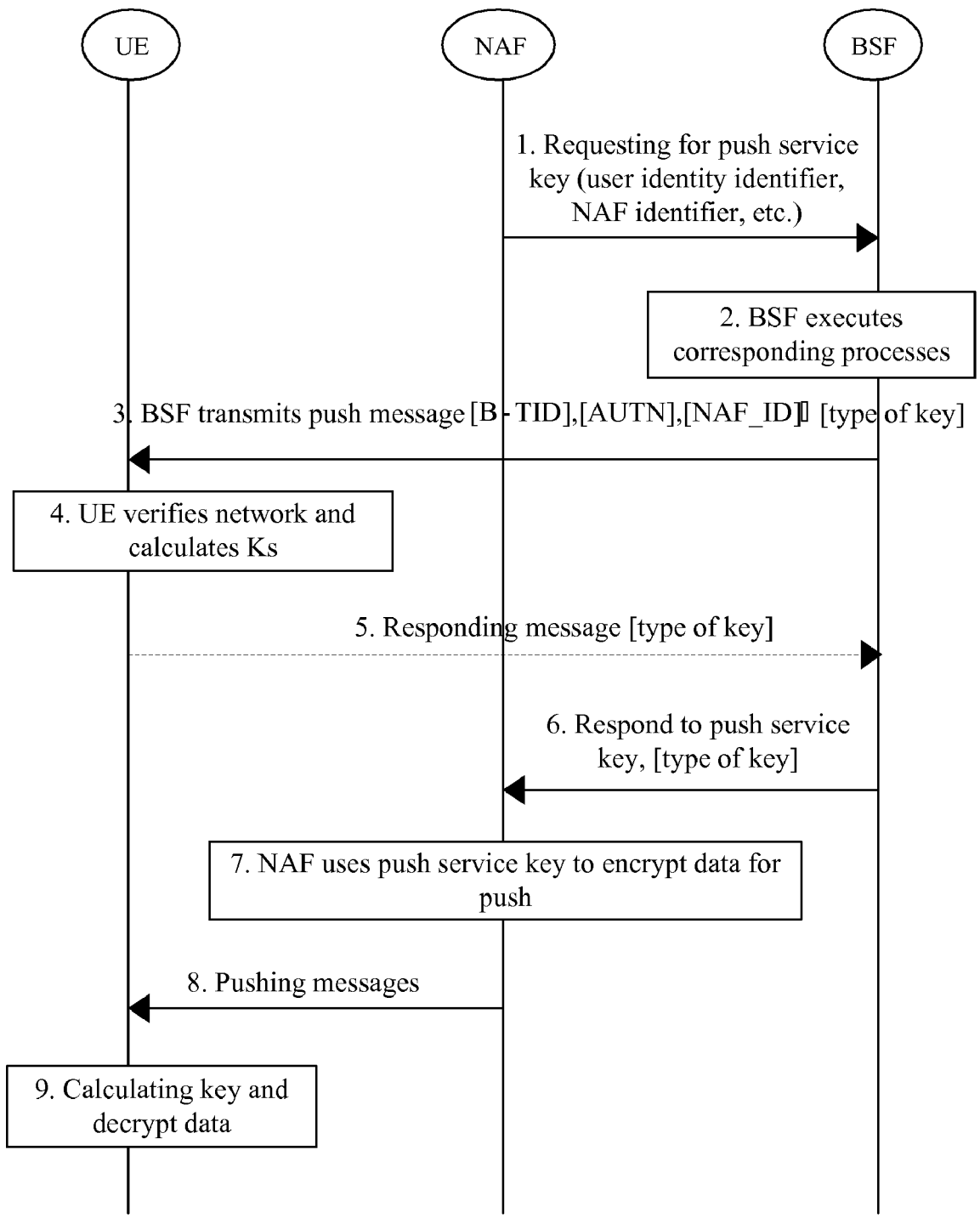
FIG. 6 illustrates an implementation flow chart of a method according to a second embodiment of the present invention.

Reference is made to FIG. 6, which illustrates an implementation flow of a method according to a second embodiment of the present invention.

In this embodiment, the BSF and the UE determine jointly a type of key for a push service. The flow includes the following steps.

1. The NAF intends to transmit a push message to a user. If there is not yet any push service key locally, then the NAF requests the BSF for a push service key by carrying information of a user identifier, an NAF identifier (NAF_ID), etc., in a message. Particularly, the user identifier may be a private identifier IMPI or permanent identifier IMSI of the user or another identifier which can uniquely identify the user. If the NAF has its own requirement on the type of key, then the message may further include the type of key as required by the NAF for use.

2-3. The BSF executes corresponding processes which primarily involve the followings upon reception of the request.

The BSF firstly obtains a set of new authentication vectors from the HSS and then transmits a push message to the UE by carrying in the message AUTN, RAND and/or B-TID and also possibly NAF-ID.

Furthermore, the BSF can further determine a type of key for use in accordance with the type of key required by the NAF for use and also possibly further in view of a certain policy of the BSF operator if any. In this case, the push message shall further include a selected type of key.

4. The UE verifies the network against AUTN and RAND and calculates Ks upon reception of the push message.

5. The UE transmits a response message to the BSF if there is a feedback channel of the UE to the BSF. If the UE cannot support the type of key determined by the BSF, then a type of key selected by the UE can be carried in the response message, so that the BSF can re-determine a type of key for the push service or determine whether to transmit a push message to the UE in view of capabilities of the UE.

6. The BSF transmits calculated GBA keys (Ks_(ext/int)_NAF) to the NAF.

In the case of GBA_U, a key of only the type of key as negotiated about can be transmitted to the NAF, or both of calculated keys and the type of key selected by the BSF and/or the UE can be transmitted to the NAF which in turn can make selection.

Furthermore, the BSF can further determine whether the type of key selected by the UE is qualified if the type of key selected by the UE is carried in step 5.

7. The NAF uses the GBA key to encrypt push service for transmission.

8. The NAF transmits to the UE a push message containing the data and also possibly the type of the encryption key.

9. The UE uses the corresponding key to decrypt the received push message.

Figure 7:
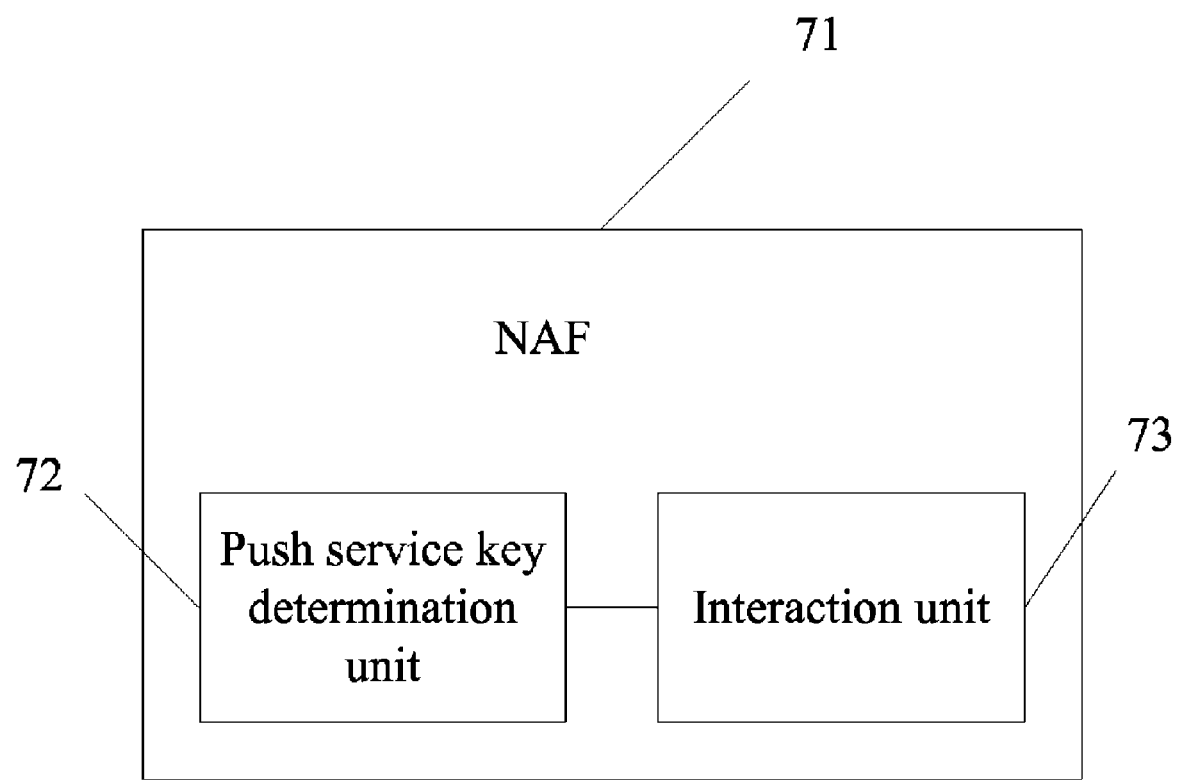
FIG. 7 illustrates a network application function entity according to an embodiment of the present invention.

As illustrated in FIG. 7, an embodiment of the present invention further discloses a network application function entity NAF 70, including the following: a push service key determination unit 71, adapted to determine a push service key as required for use; and an interaction unit 72, adapted to notify the user side about the push service key determined at the network side and to push service security-protected with the push service key to the user side.

Figure 8:
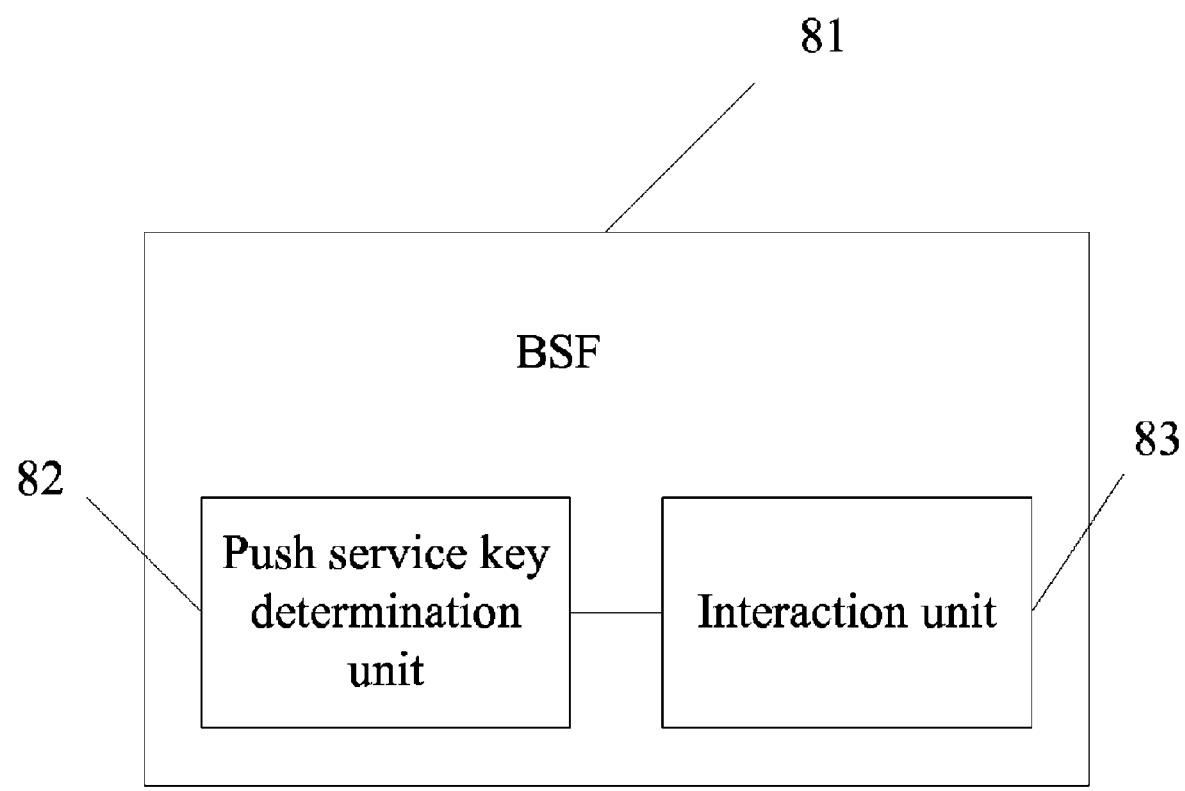
FIG. 8 illustrates a bootstrapping authentication protocol server function entity according to an embodiment of the present invention.

As illustrated in FIG. 8, an embodiment of the present invention further discloses a bootstrapping authentication protocol server function entity BSF 80, including the following: a push service key determination unit 81, adapted to determine a push service key as required for use; and an interaction unit 82, adapted to notify the user side and/or a network application function entity NAF about the determined push service key as required for use.

Although the invention has been described with reference to the embodiments, those ordinarily skilled in the art shall appreciate that numerous modifications and variations thereto are possible without departing from the spirit of the invention. The appended claims are intended to encompass these modifications and variations without departing from the spirit of the invention.

What is claimed is:

1. A method for implementing a push service of the generic authentication architecture, comprising:
   selecting, by a bootstrapping authentication protocol server function entity (BSF), a type of key available to a Network Application Function (NAF), obtaining a key Ks for calculation of a push service key of the NAF, and calculating derived keys of Ks;
   taking one among the derived keys of the selected type of key as the push service key as required by the NAF for use;
   transmitting, by the BSF, the push service key of the selected type of key to the NAF; and
   the NAF notifying a user side the push service key type so that the user side obtains the push service by using a qualified push service key associated with the push service key type.

2. The method according to claim 1, wherein the step of notifying, by the network side, a user side the push service key type comprises:
   notifying, by the NAF, the user side by sending a push message or by sending a service announcement.

3. The method according to claim 1, wherein the step of selecting by the BSF the type of key available to the NAF comprises:
   determining, by the BSF, the type of key in accordance with a key selection rule determined when the user subscribes with the network; or
   determining, by the BSF, the type of key in accordance with an attribute of an application; or
   determining, by the BSF, the type of key in accordance with a key selection rule prescribed in an application specification and a user attribute; or
   determining, by the BSF, the type of key in accordance with either or both of its own policy and the type of key.

4. A method for implementing a push service of the generic authentication architecture, comprising:
   obtaining, by a bootstrapping authentication protocol server function entity (BSF), a key shared with a user side, and calculating derived keys of the shared key;
   sending the calculated derived keys of the shared key to a Network Application Function (NAF);
   selecting, by the NAF, an available type of key;
   taking one among the derived key of the selected type of key as the push service key required by the NAF for use; and
   notifying, by the NAF, a user side the push service key type so that the user side obtains the push service by using a qualified push service key associated with the push service key type.

5. The method according to claim 4, wherein the step of sending the calculated derived keys of the shared key to the NAF further comprises:
   carrying, by the BSF, an indication of the key selection policy or user subscription information prescribed by the BSF in a message returning the derived keys to the NAF; and
   the step of selecting by the NAF the available type of key comprises:
   selecting, by the NAF, the available type of key in accordance with an indication of the key selection policy or the user subscription information returned by the BSF.

6. The method according to claim 4, wherein the step of selecting by the NAF the available type of key comprises:
   selecting, by the NAF, the available type of key in accordance with its own key selection policy; or
   selecting, by the NAF, the available type of key in accordance with a type of key prescribed in an application specification.

7. A method for implementing a push service of generic authentication architecture, comprising:
- determining, at a network side, a push service key, and using the push service key for communication with a user side; and
- determining, at the user side, a push service key consistent with the network side, and using the push service key to obtain push service;
- wherein the step of determining at the network side the push service key comprises:
- determining, by a bootstrapping authentication protocol server function entity, BSF, the push service key as required by a network application function entity, NAF, for use;
- wherein the step of determining by the BSF the push service key as required by the NAF for use comprises:
- selecting, by the BSF, a type of key available to the NAF, obtaining a key Ks for calculation of the push service key of the NAF, and calculating derived keys of Ks;
- taking the derived keys associated with the selected key type as the push service key as required by the NAF for use; and
- transmitting, by the BSF, the push service key to the NAF.

8. The method according to claim 7, wherein the step of selecting by the BSF the type of key available to the NAF comprises:
- determining, by the BSF, the type of key in accordance with a key selection rule upon subscription with the network; or
- determining, by the BSF, the type of key in accordance with an attribute of an application per se; or
- determining, by the BSF, the type of key in accordance with a key selection rule prescribed in an application specification and a user attribute; or
- determining, by the BSF, the type of key in accordance with one or more of user-side information fed back from the user side, a policy of the BSF and the type of key as required for the NAF.

9. The method according to claim 8, wherein the BSF obtains the type of key as required for the NAF by:
- requesting, by the NAF, the BSF for the push service key, and transmitting the type of key as required for the NAF to the BSF.

10. The method according to claim 7, wherein, before the BSF selects the type of key available to the NAF, the method further comprises:
- transmitting, by the BSF, a push message to the user side; and
- feeding, from the user side, back to the BSF the type of key as required for use or a location of an application in a response message.

11. A method for implementing a push service of generic authentication architecture, comprising:
- determining, at a network side, a push service key, and using the push service key for communication with a user side; and
- determining, at the user side, a push service key consistent with the network side, and using the push service key to obtain push service;
- wherein the step of determining at the network side the push service key comprises:
- determining, by a network application function entity NAF, the push service key as required by itself for use;
- wherein the step of determining by the NAF the push service key required by the NAF for use comprises:
- obtaining, by the BSF, a key shared with the user side, and calculating derived keys of the shared key;
- sending the calculated derived keys of the shared key to the NAF;
- selecting, by the NAF, an available type of key; and
- taking one among the derived key associated with selected key type as the push service key required by the NAF for use.

12. The method according to claim 11, wherein the step of sending the calculated derived keys of the shared key to the NAF further comprises:
- carrying, by the BSF, a key selection policy or user subscription information prescribed by the BSF in a message sending the derived keys to the NAF; and
- the step of selecting by the NAF the available type of key comprises:
- selecting, by the NAF, the available type of key in accordance with the key selection policy or user subscription information sent by the BSF.

13. The method according to claim 11, wherein, before the step of selecting by the NAF the available type of key, the method further comprises:
- transmitting, by the NAF, a push message to the user side;
- feeding, from the user side, back to the NAF the type of key as required for use or the location of an application client in a response message; and
- the step of selecting by the NAF the available type of key comprises:
- selecting, by the NAF, in accordance with information on the type of key fed back from the user side and in connection with a key selection policy at the network side.

14. A method for implementing a push service of generic authentication architecture, comprising:
- determining, at a network side, a push service key, and using the push service key for communication with a user side; and
- determining, at the user side, a push service key consistent with the network side, and using the push service key to obtain push service;
- wherein the push service key consistent with the network side is determined at the user side by:
- obtaining, at the user side, the type of key as required by the network side for use, and determining Ks derived key associated with key type as the push service key;
- wherein the step of obtaining at the user side the type of key as required by the network side for use comprises:
- notifying, by a BSF or an NAF at the network side, the user side about the determined type of key by transmission of a push message; or
- notifying, by the BSF or the NAF at the network side, the user side by sending a service announcement; or
- obtaining, at the user side, the type of key determined at the network side through downloading; or
- storing locally information for key selection when the user subscribes with the network.

15. A method for implementing a push service of generic authentication architecture, comprising:
- determining, at a network side, a push service key, and using the push service key for communication with a user side; and
- determining, at the user side, a push service key consistent with the network side, and using the push service key to obtain push service; wherein the step of determining at the user side the push service key consistent with the network side comprises:

selecting a derived key stored on a universal integrated circuit card UICC when a push service message to be processed by the UICC is received at the user side, and selecting a derived key stored on a mobile equipment ME when a push service message to be processed by the ME is received at the user side; or making, at the user side, sequential attempts on the derived keys stored on the universal integrated circuit card UICC and on the mobile equipment ME, and determining a qualified derived key in accordance with attempt results; or selecting, at the user side, in accordance with a key selection rule prescribed in an application specification and in connection with its own capabilities.

16. A bootstrapping authentication protocol server function entity BSF, comprising:
- a selecting unit, configured to select a type of key available to a Network Application Function (NAF);
- an obtaining unit, configured to obtain a key Ks for calculation of a push service key of the NAF;
- a calculating unit, configured to calculate derived keys of Ks;
- a taking unit, configured to take one among the derived keys of the selected type of key as the push service key as required by the NAF for use;
- a transmitting unit, configured to transmit the push service key of the selected type of key to the NAF.

* * * * *